Jan. 25, 1955

C. H. BEARE 2,700,183

METHOD OF MAKING SEALING STRIPS FOR
REFRIGERATOR DOORS AND THE LIKE

Filed Feb. 21, 1951

INVENTOR.
CHARLES H. BEARE
BY
Willits, Hardman & Fehr
HIS ATTORNEYS

United States Patent Office 2,700,183
Patented Jan. 25, 1955

2,700,183

METHOD OF MAKING SEALING STRIPS FOR REFRIGERATOR DOORS AND THE LIKE

Charles H. Beare, Dayton, Ohio, assignor to General Motors Corporation, Detroit, Mich., a corporation of Delaware Application February 21, 1951, Serial No. 212,019

2 Claims. (Cl. 18—53)

This invention relates to cushioning sealing strips of rubber or rubber-like material especially adapted for use as sealing strips for refrigerator doors and the like.

An object of this invention is to provide a bulb-section sealing strip which is cured in a frame-like predetermined longitudinal shape, such as the contour of that portion of the door frame to which it is to be attached, by an efficient and economical method.

A great advantage of this invention is the simple but highly efficient method of providing inherently curved corners of predetermined shape in the final cured strip, so that the final frame-like strip will properly fit the part to which it is to be attached, such as a refrigerator door or other part. Heretofore such bulb-section strips have usually been fitted to the door or other part by providing mitered corners in the strip, that is, by cutting the strip in two at a 45 degree angle at the corners in order to make the mitered corner. Another known method is to provide separately molded corner portions which are fitted in place at the corners of the door frame to complete the straight main portions of the sealing strip in order to form a continuous seal around the door frame or other part. Both of these methods of forming corners require individual cutting or fitting of the strip either before or at the time of assembling same onto the door. Since the strips made according to this invention already have the corner portions formed therein, no cutting or substantial bending of the cured strips is necessary at any time. It is pointed out that such bulb-section strips cannot be properly bent around the corners at the time of assembling same onto the door because the bulb-section will ordinarily collapse at the bend or at least pucker and wrinkle to such an extent as to give a very poor seal at such corners.

Another important advantage in connection with this invention lies in the fact that the bulb-section sealing strip may first be economically made by extruding the uncured strip in continuous length. Thereafter suitable lengths of this same section extruded strip may be applied to any one of various different curing forms to give a final cured strip having the desired predetermined longitudinal shape or contour. Thus no costly molds are required in any case, and only a relatively simple and inexpensive curing form is needed for each different final longitudinal contour or shape. It is pointed out that the curing form is not a mold since it does not provide the cross-sectional shape to the strip but merely retains the uncured strip in the desired longitudinal contour while it is being cured.

Further objects and advantages of the present invention will be apparent from the following description, reference being had to the accompanying drawings wherein a preferred embodiment of the present invention is clearly shown.

Figure 3:
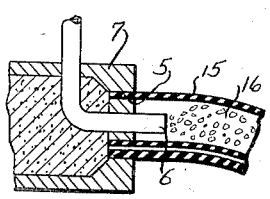

Fig. 3 diagrammatically shows an apparatus for extruding a thin wall casing with a filling therefore.

Similar reference characters refer to similar parts throughout the several views.

The sealing strip 10 shown in the drawings comprises a main bulb-section portion 11 and a flexible attachment flap 12 integrally joined thereto by a flexible neck 13. The main bulb-section 11 comprises a thin-wall outer casing 15 of flexible rubber (or other well-known rubber-like material) which is integral with flap 12. This thin-wall casing 15 and flap 12 may be made in continuous length by extruding the uncured plastic material thru a correspondingly shaped extrusion aperture 5 as in Fig. 3 in a manner well known to those skilled in the art. This thin-wall casing 15 is filled with an ungelled freely flowing foamed rubber latex compound 16 by flowing the ungelled latex compound thereinto, preferably by providing a filling nozzle 6 for said latex compound extending thru the central portion of the extrusion die 7 and progressively filling casing 15 with the ungelled foamed latex compound immediately after said casing 15 emerges from the extrusion die. Preferably a quick-gelling foamed latex compound is used. As soon as the latex filling 16 gels it provides a substantial interior support for the thin-wall casing 15 and hence effectively maintains casing 15 in the desired cross-sectional shape while it is in its uncured and hence relatively weak condition (see Fig. 2).

Figure 1:
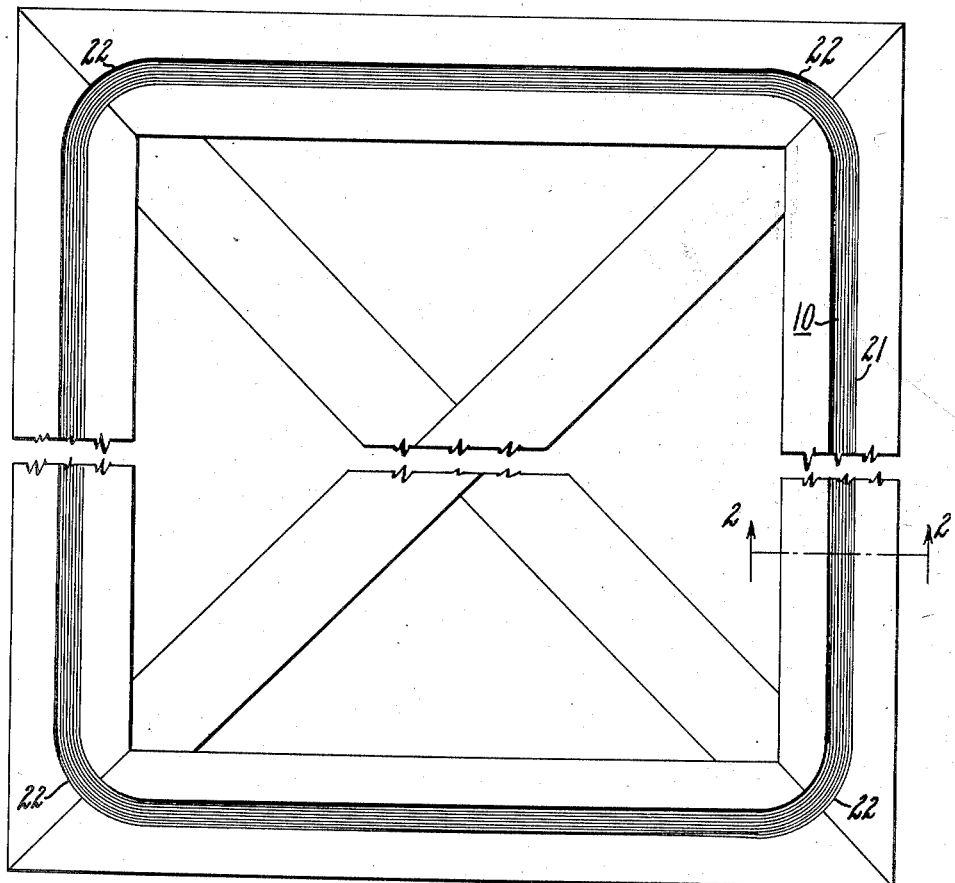
Fig. 1 is a plan view showing the uncured flexible bulb-section strip retained in bent shape in a curing form.

Now according to this invention, the uncured flexible strip 10 is cut into proper lengths for the purpose and each length is laid in a curing form which will retain the strip 10 in the desired longitudinal configuration while it is being cured. Fig. 1 illustrates a wooden curing form 20 having a continuous rectangular-section groove 21 extending therearound. The uncured strip 10 is sufficiently pliable to be readily bent around the rounded corners 22 of groove 21 without collapsing or material wrinkling of the cross-section of the bulb portion 11. The pliable gelled foamed latex filling 16 prevents such collapsing or wrinkling of the thin-wall casing 15 yet at the same time will readily permit the necessary longitudinal bending thereof. Thus the uncured strip 10 may be readily given any desired longitudinal configuration, such as the one-piece door seal shown in Fig. 1. Preferably strip 10 fits closely within groove 21 over the straight portions thereof (see Fig. 2) so as to maintain strip 10 against material lateral movement within groove 21 during curing thereof. However it is not necessary that groove 21 be shaped in cross-section to conform to the cross-section of strip 10, since the strip 10 retains its own cross-section while curing due to the foamed latex filling 16 therein as described above. The curing forms 20 may be of steel or other suitable material rather than of wood as shown.

Figure 2:
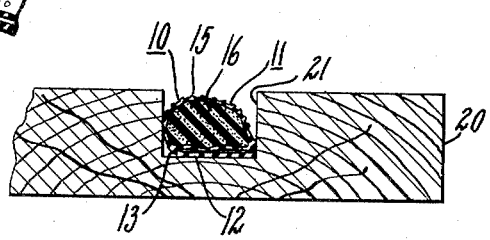
Fig. 2 is a section on line 2—2 of Fig. 1.

A number of curing forms 20, with strips 10 inserted in place therein, may be suitably stacked in horizontal position and put into a curing retort and the strips 10 cured under suitable curing conditions of temperature and pressure in a well-known manner. After being properly cured the strips 10 are removed from grooves 21 in the curing forms 20 and will then retain the longitudinal shape in which they have been cured. That is, even though the cured strips are still flexible the curved corners thereof inherently return to the shape in which they were finally cured and hence will need no bending at the corners in order to attach them to the door or other part for which they are designed. The flexible flange 12 is suitably soaped in a well-known manner to prevent possible sticking or bonding by vulcanization to the casing 15 during the curing operation. The final cured strip is attached to the door frame or other part by flexing the bulb-section portion 11 out of the way by swinging about the flexible hinge 13 to expose the attachment flange 12 and permit it to be nailed, screwed or otherwise suitably secured to the door frame. After flange 12 is attached to the door frame the bulb-portion 11 inherently returns to its position relative to flange as shown in Fig. 2, and thus conceals flange 12 and its attachment nails or other means.

While the embodiment of the present invention as herein disclosed, constitutes a preferred form, it is to be understood that other forms might be adopted.

What is claimed is as follows:

1. In a method of making a bulb-section strip from a vulcanizable material formed and cured in a predetermined geometrical shape, the steps comprising: providing a predetermined length of uncured extruded longitudinal flexible strip of uncured rubber compound, which strip has a thin-wall bulb-section, filling said thin walled bulb section with uncured foamed latex, gelling the latex foam within said thin walled bulb section, bending said filled strip around a form into its desired geometrical shape by causing the gelled foamed latex filling within said bulb-section to yield sufficiently to permit bending of said strip around corners of the curing form while said filling exerts an interior pressure on said bulb section to prevent collapse of the bulb at the bent portions thereof, then curing and bonding said bulb-section and latex filling together while in said predetermined geometrical shape while said strip is in an unconfined condition on said form to cause said strip to inherently retain said predetermined geometrical shape and finally removing the shaped and vulcanized strip from the form.

2. In a method of forming a composite strip of predetermined geometrical configuration from a relatively straight uncured strip, the steps comprising; providing an uncured extruded longitudinally extending flexible tubular casing of curable elastomeric material having relatively thin tubular walls, filling said casing with foamed latex in an uncured and ungelled condition, thereby maintaining the shape of the casing and forming a composite strip, gelling the latex foam within said casing, bending the filled strip into the desired predetermined geometrical configuration by flexing said strip around a curing form and thereby causing the ungelled foamed latex filling within said casing to yield sufficiently to permit bending of said casing around said shaped corners without collapsing the cross section thereof; then curing said formed casing and foamed latex filling in situ while said strip is in the unconfined condition upon said form and thereby bonding the filling to the casing while simultaneously causing the composite strip to inherently retain a predetermined geometrical configuration.

References Cited in the file of this patent

UNITED STATES PATENTS

| | | |
|---|---|---|
| 706,590 | Osgood | Aug. 12, 1902 |
| 876,755 | Webb | Jan. 14, 1908 |
| 1,227,791 | Huebner | May 29, 1917 |
| 1,877,628 | Replogle | Sept. 13, 1932 |
| 2,166,629 | White | July 18, 1939 |
| 2,200,262 | Daley | May 14, 1940 |
| 2,538,406 | Allen | Jan. 16, 1951 |
| 2,574,391 | Herrly | Nov. 6, 1951 |